United States Patent [19]

Doubrawa et al.

[11] Patent Number: 5,259,868

[45] Date of Patent: Nov. 9, 1993

[54] PROCESS FOR PURIFYING EXHAUST AIR FROM PLANT PARTS OF OIL MILLS

[75] Inventors: Franz Doubrawa, Tribuswinkel; Martin Joksch, Baden, both of Fed. Rep. of Germany

[73] Assignee: Radex-Heraklith Industriebeteiligungs Aktiengesellschaft, Vienna, Austria

[21] Appl. No.: 985,890

[22] Filed: Dec. 4, 1992

[30] Foreign Application Priority Data

Apr. 12, 1991 [DE] Fed. Rep. of Germany ....... 4140006

[51] Int. Cl.⁵ ...................... B01D 46/46; B01D 47/05
[52] U.S. Cl. ............................................ 95/12; 95/39; 95/273; 95/288
[58] Field of Search ...................... 55/80, 97, 338, 23, 55/68, 74

[56] References Cited

U.S. PATENT DOCUMENTS 4,845,334  7/1989  Stocks et al. ........................ 55/338

Primary Examiner—Robert Spitzer
Attorney, Agent, or Firm—John F. A. Earley; John F. A. Earley, III

[57] ABSTRACT

The present invention pertains to a process for purifying the exhaust air from plant parts of oil mills, in which the exhaust air removed from the plant is returned, after part of it had been discharged, into the plant in a cycle.

11 Claims, 1 Drawing Sheet

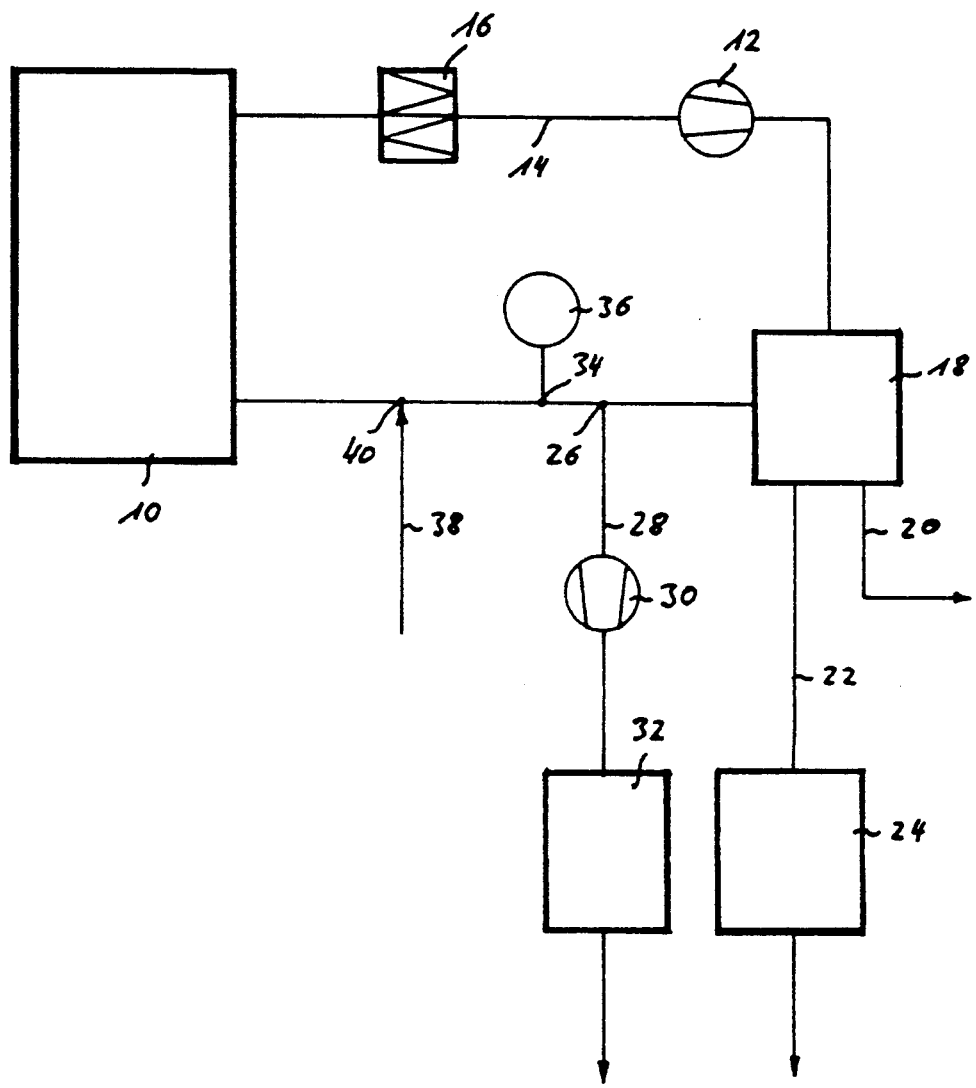

PROCESS FOR PURIFYING EXHAUST AIR FROM PLANT PARTS OF OIL MILLS

The present invention pertains to a process for purifying the exhaust air from plant parts of oil mills. Both the state of the art and the present invention will be described in greater detail below on the basis of the purification of exhaust air from so-called DTC plants, but these plants serve only as an example. In this respect, the process is also suitable for purifying exhaust air from other plant parts.

So-called DTC (Desolventizer-Toaster-Cooler) plants, sometimes also called simply "toasters," represent a treatment unit for the processing of seeds, e.g., rapeseeds, sunflower-seeds or the like, into the corresponding edible oils.

The principle of the process is as follows: The seeds are subjected to pretreatment. In a first pretreatment step, flaking is performed for the preliminary breaking up of the seeds. The seeds are subsequently heated and then they enter presses, in which a large portion of the oil content is pressed out. After purification, the pressed oil is sent into a desliming unit. The warm press cake is charged into an extraction step. The oil still present is washed out here with a solvent, e.g., hexane. The residual extracted bruised grain is then freed of the residual solvent in the DTC plant, brought to a consistency that is suitable for storage, and conveyed into bruised grain silos.

The mixture of pressed oil and extracted oil is sent to the desliming unit, in which water, water-soluble constituents, and suspended particles are removed from the mixture. After final cooling, the crude oil, which is now completely deslimed, is filled into storage tanks.

The DTC plant is usually designed as a plant consisting of a plurality of steps arranged one on top of another. The material being processed passes through the plant from top to bottom, and is transferred between the steps by means of corresponding cellular wheel sluices. In the first, upper steps, the mixture of bruised grains and solvent is treated with steam, and is additionally heated by means of an external heating means, e.g., steam-heated double bottoms. Components of the solvent are thus expelled from the solids (grain). Drying (so-called toaster step) and, finally, cooling of the purified bruised grain take place in the further steps of the DTC plant.

Fresh air is usually used to dry and cool the residual bruised grain of the said oil seeds. The exhaust air generated thereafter is contaminated with considerable amounts of odoriferous substances, but also with residues of gasoline and solid components, e.g., fiber components of the plants. The odoriferous substances represent a particular problem. If they are discharged, as before, into the atmosphere with the exhaust air, they cause considerable odor nuisance in the environment. A "dust separator" arranged in the path of the exhaust air cannot prevent the problem of odor nuisance due to the gaseous odoriferous substances, either.

This is where the basic task of the present invention begins. A possibility is sought for treating the exhaust air from the said units of an oil mill such that the odor nuisance will be minimized and preferably eliminated.

To accomplish this task, it has been recognized in the present invention that circulating the exhaust air flow in a closed cycle is necessary. If the exhaust air is circulated, at least partially, in closed cycle, i.e., it is later returned into the plant after it has been removed from it, this inherently leads to the corresponding odoriferous and other impurities to become concentrated. It has also been recognized in the present invention that it is possible to manage the considerable amounts of exhaust air in terms of treatment if a partial flow of the concentrated exhaust air is removed, purified and then discharged, and the exhaust air discharged is at the same time replaced with a corresponding amount of fresh air, so that the circulating air flow on the whole remains constant.

In contrast, direct purification of the exhaust air from the plant cannot be considered practicable due to the large volume flows, because corresponding purification plants would be ineffective and unmanageable in terms of both technology and costs.

In its general embodiment, the present invention pertains to a process for purifying the exhaust air from units of oil mills, comprising the following steps, which are consecutive in terms of flow:

the exhaust air containing heat, moisture, and odoriferous substances is removed from the plant, the exhaust air is cooled and dried, a partial flow of the exhaust air is removed, purified, and discharged, an amount of fresh air essentially equivalent to the amount of exhaust air removed is fed into the remaining residual exhaust air flow, and the amount of exhaust air consisting of the residual exhaust air flow and the fresh air, is fed into the plant at a point separate from the point of removal.

Consequently, in agreement with the state of the art, exhaust air is first removed from the plant. However, this is now first cooled and dried rather than being simply discharged into the atmosphere through a smokestack. Waste heat is released during cooling, and this waste heat can be used for direct or indirect heat recovery. A (warm) condensate is also generated during drying; this condensate is charged into the (DTC) plant e.g., as boiler feed-water for subsequently introducing steam. Both the utilization of the waste heat and the utilization of the condensate offer considerable advantages in terms of energy and costs, which were impossible in the case of the simple discharge of the exhaust air into the ambient atmosphere. Thus, the feed water for generating the direct steam in the upper steps of the DTC plant can be obtained quasi in situ.

However, the problem of eliminating the odoriferous substances has not yet been solved up to this step.

To solve this problem, a partial flow of the exhaust air is subsequently removed and purified. This process step will be explained in greater detail below.

To ensure a constant volume flow necessary for circulating the exhaust air, fresh air is subsequently fed into the remaining residual exhaust air flow, and the amount of fresh air essentially corresponds to the amount of exhaust air discharged before.

The amount of exhaust air, which thus consists of the residual exhaust air flow and the fresh air fed in, is finally returned into the DTC plant at a point separate from the point of removal. The "cycle" is thus closed.

It is obvious that concentration of the impurities, especially the odoriferous substances, takes place during this circulation. This concentration is knowingly accepted, and it even represents one essential characteristic of the process according to the present invention.

By doing so, it is possible to remove a correspondingly concentrated partial flow of the exhaust air at the said point and thus to carry out efficient, economical purification of the exhaust air in a well controllable plant, treating greatly reduced volume flows.

If the plant is operated and the amounts of exhaust air discharged and the amounts of fresh air fed in are adjusted accordingly, a more or less constant flow of exhaust air with a defined concentration of odoriferous substances and other impurities will become established.

The purification of the exhaust air removed may be carried out in various manners. According to one particularly advantageous embodiment, the exhaust air removed is purified in a biofilter. Such filters have been known in a different context. Thermal, catalytic, absorptive or adsorptive purification of the exhaust air removed is also possible.

As a result, clean air is removed from the purification step, and this air, not containing odoriferous substances and other impurities, can be discharged into the ambient atmosphere.

To ensure the described circulation of the exhaust air, the circulating air flow should be designed as a closed cycle.

To optimize the purification of the exhaust air, a dust filter is arranged in front of the drying and cooling step according to an advantageous embodiment, and the exhaust air is passed through this [dust filter] in order also to remove solid particles present in the exhaust air, e.g., fiber components from the plants. Finally, this also increases the purity of the air issued from the purification plant into the ambient atmosphere.

A fan may be used to adjust the circulating exhaust air flow, passing the circulating air flow through the fan preferably such that an excess pressure will be generated between the fan and the site of fresh air feed and a vacuum between the site of fresh air feed and the fan. Constant pressure conditions are thus ensured in a plant with the new process. It is also possible correspondingly to convert (retrofit) prior-art, conventional plants.

It was mentioned that the waste heat generated during the cooling/drying step can be thermically utilized. To do so, the waste heat is passed through a heat exchanger. The heat may be utilized at any point of the pretreatment process described in the introduction, where it is needed, or it may be used elsewhere, e.g., for heating swimming pools or office and living spaces.

Another advantage is the fact that purified exhaust air obtained after the purification step can be used at least partially as fresh air to compensate for the amount of exhaust air removed.

It is particularly advantageous for the amount of the exhaust air removed from the cycle for exhaust air purification and/or for the amount of the fresh air fed in—subsequently in terms of flow—to be regulated and/or controlled as a function of the concentration of the odoriferous substances and other impurities present in the exhaust air. This can be achieved by means of corresponding measuring devices along the path of the exhaust air.

The present invention will be described in greater detail below on the basis of an exemplary embodiment. The only figure shows, in schematic representation, a flow chart of the process according to the present invention.

A DTC plant is designated by reference numeral 10. The warm, humid exhaust air, containing odoriferous substances, is removed from the said DTC plant 10 via a fan 12, which is arranged along an exhaust air line 14, and is first passed through a mechanical dust filter 16.

The exhaust air subsequently enters a unit, designated by reference numeral 18, in which it is cooled and dried. The waste heat now generated is removed via a line 20 and utilized via a heat exchanger (not shown).

The condensate generated during drying in the said unit 18 is removed via another line 22, processed in a device 24, and is finally discharged as clean water.

The said exhaust air line 14 leaving the said unit 18 has a valve 26 that is connected to a line 28 that communicates with a fan 30 that draws a partial flow of the cooled and dried exhaust air contained in the said exhaust air line 14 out of the said line 14 and delivers it into a biofilter 32. The said biofilter 32 and its function will be described in greater detail below.

Another valve 34 that is in connection with a device 36, with which the concentrations of the odoriferous substances and other impurities can be determined, is arranged along the said exhaust air line 14 downstream of the said valve 26 in terms of flow. The said device 36 will also be explained in greater detail below.

The said exhaust air line 14 finally returns from the said valve 34 to the said DTC plant 10, and a fresh air line 38 opens into the said exhaust air line 14 along this section.

A valve 40 is provided at the connection point between the said fresh air line 38 and the said exhaust air line 14, and this [valve 40] is controlled by the said device 36 such that the amount of fresh air fed in here corresponds to the amount of air removed via the said line 28 into the said biofilter 32 in order to set a constant, circulating flow of the exhaust air.

In this arrangement, there will be a certain excess pressure in the said exhaust air line 14 within the said exhaust air line [section] 14 between the said fan 12 and the said valve 40, and this [excess pressure] is compensated at the valve site at 40 to atmospheric pressure, while a certain vacuum is set between the said valve 40 and the said fan 12 because of the action of the said fan 12.

Based on the closed cycle of the exhaust air, the odoriferous substances and other impurities are concentrated. Thus, a correspondingly concentrated exhaust air flow is removed via the said line 28 and is delivered into the said biofilter 32. High efficiency of waste gas purification with a small volume flow can thus be achieved in the said biofilter 32. After passage through the said biofilter 32, clean air freed of odoriferous substances and other impurities that can be fed as fresh air into the said line 38 if needed is obtained.

In an alternative embodiment of the invention, biofilter 32 may be replaced by another purification process, such as a catalytically operating purification process 32.

We claim:

1. Process for purifying exhaust air from plant parts of oil mills, comprising the following steps that are consecutive in terms of flow:
   1.1. The exhaust air, containing heat, moisture and odoriferous substances, is removed from the plant,
   1.2. the exhaust air is cooled and dried,
   1.3. a partial flow of the exhaust air is removed, purified, and discharged,
   1.4. an amount of fresh air that is essentially equivalent to the amount of the exhaust air removed is fed into the remaining residual exhaust air flow, and
   1.5. the amount of exhaust air, consisting of the residual exhaust air flow and the fresh air, is returned into the plant at a point separate from the point of removal.

2. Process in accordance with claim 1, in which the circulating exhaust air flow is designed as a closed cycle.

3. Process in accordance with claim 1, in which the exhaust air is passed through a dust filter prior to the drying and cooling step.

4. Process in accordance with claim 1, in which the circulating air flow is passed through a fan such that an excess pressure occurs for the fresh air between the fan and the site of fresh air feed, and a vacuum occurs between the site of fresh air feed and the fan.

5. Process in accordance with claim 1, in which the condensate generated from the exhaust air during the cooling and drying step is fed into the plant as boiler feed-water for subsequently admitting steam into the plant.

6. Process in accordance with claim 1, in which the waste heat generated during the cooling and drying step is sent into a heat exchanger.

7. Process in accordance with claim 1, in which the exhaust air removed from the circulating exhaust air flow is passed through a biofilter and purified there.

8. Process in accordance with claim 1, in which the exhaust air removed from the circulating exhaust air flow is subjected to a catalytically operating purification process.

9. Process in accordance with claim 1, in which purified exhaust air obtained after the purification step is mixed at least partially into the fresh air fed in.

10. Process in accordance with claim 1, in which the amount of the exhaust air removed from the circulation for exhaust air purification and/or the amount of the fresh air subsequently fed in is regulated as a function of the concentration of the odoriferous substances and other impurities present in the exhaust air.

11. Process for purifying exhaust air from plant parts of oil mills, comprising the following steps that are consecutive in terms of flow:

11.1. The exhaust air, containing heat, moisture and odoriferous substances, is removed from the plant, 11.2. the exhaust air is cooled and dried, 11.3. a partial flow of the exhaust air is removed, purified, and discharged, 11.4. an amount of fresh air that is essentially equivalent to the amount of the exhaust air removed is fed into the remaining residual exhaust air flow, and 11.5. the amount of exhaust air, consisting of the residual exhaust air flow and the fresh air, is returned into the plant at a point separate from the point of removal, in which the circulating exhaust air flow is designed as a closed cycle, in which the exhaust air is passed through a dust filter prior to the drying and cooling step, in which the circulating air flow is passed through a fan such that an excess pressure occurs for the fresh air between the fan and the site of fresh air feed, and a vacuum occurs between the site of fresh air feed and the fan, in which the condensate generated from the exhaust air during the cooling and drying step is fed into the plant as boiler feed-water for subsequently admitting steam into the plant, in which the waste heat generated during the cooling and drying step is sent into a heat exchanger, in which the exhaust air removed from the circulating exhaust air flow is passed through a biofilter and purified there, in which purified exhaust air obtained after the purification step is mixed at least partially into the fresh air fed in, in which the amount of the exhaust air removed from the circulation for exhaust air purification and/or the amount of the fresh air subsequently fed in is regulated as a function of the concentration of the odoriferous substances and other impurities present in the exhaust air.

* * * * *